US012566708B2

(12) United States Patent
Moore et al.

(10) Patent No.: US 12,566,708 B2
(45) Date of Patent: Mar. 3, 2026

(54) USING METADATA TO SELECTIVELY PERFORM DATA PRESTAGING

(71) Applicant: International Business Machines Corporation, Armonk, NY (US)

(72) Inventors: Roderick Guy Charles Moore, Bournemouth (GB); Paul A. Broadhurst, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/758,883

(22) Filed: Jun. 28, 2024

(65) Prior Publication Data
US 2026/0003793 A1    Jan. 1, 2026

(51) Int. Cl.
*G06F 12/08* (2016.01)
*G06F 12/0862* (2016.01)

(52) U.S. Cl.
CPC ................................. *G06F 12/0862* (2013.01)

(58) Field of Classification Search
CPC .................................................. G06F 12/0862
USPC ........................................................ 711/118
See application file for complete search history.

(56) References Cited

U.S. PATENT DOCUMENTS

| | | | |
|---|---|---|---|
| 10,997,080 B1 | 5/2021 | Eliash et al. | |
| 2009/0249022 A1* | 10/2009 | Rowe ................... | G06F 3/0689 |
| | | | 711/E12.001 |
| 2021/0056000 A1 | 2/2021 | Rostagni et al. | |
| 2021/0109671 A1 | 4/2021 | Shabi et al. | |
| 2023/0376225 A1* | 11/2023 | Cariello ............... | G06F 3/0625 |
| 2024/0004877 A1 | 1/2024 | Shatsky et al. | |

* cited by examiner

*Primary Examiner* — Hua J Song
(74) *Attorney, Agent, or Firm* — Zilka-Kotab, P.C.

(57) ABSTRACT

A computer-implemented method, according to one approach, includes: receiving a read request for data in memory and analyzing metadata from volumes that contain the requested data. The metadata maps sequential logical addresses of the requested data to their corresponding physical addresses. The computer-implemented method also includes determining whether the corresponding physical addresses storing the requested data are sequential. In response to determining that at least a predetermined number of the corresponding physical addresses are sequential, the requested data is prestaged from the sequential ones of the physical addresses. However, in response to determining that fewer than the predetermined number of the corresponding physical addresses are sequential, the computer-implemented method includes intentionally refraining from prestaging any of the requested data from the physical addresses.

20 Claims, 5 Drawing Sheets

100

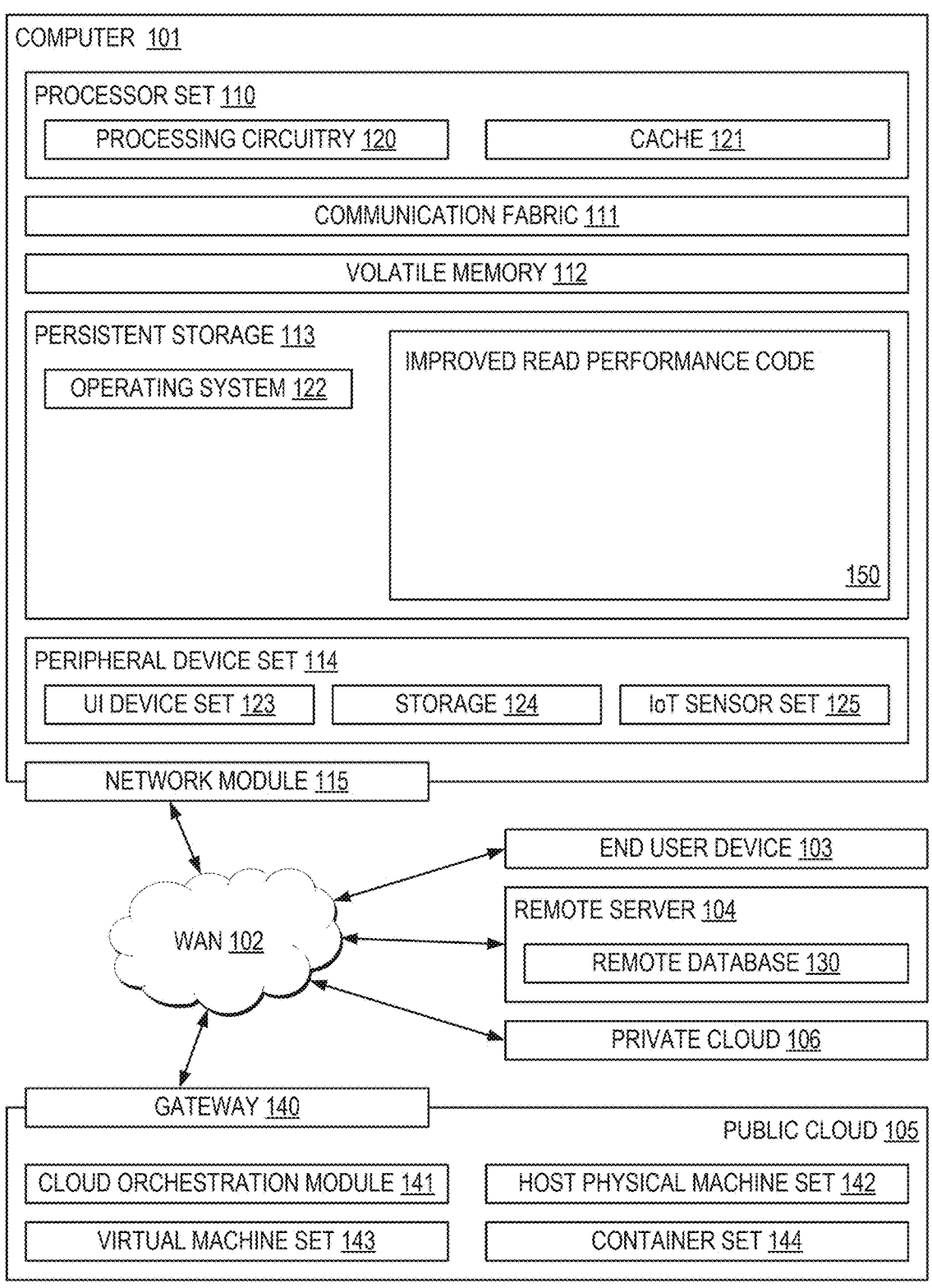

COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

IMPROVED READ PERFORMANCE CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

From operation
310

312

Intentionally refrain from
prestaging any of the
requested data from the
physical addresses

312'

314

From operation
310

316

Cause data prestaging to
be performed while
reading the requested
data from memory

316'

318

316

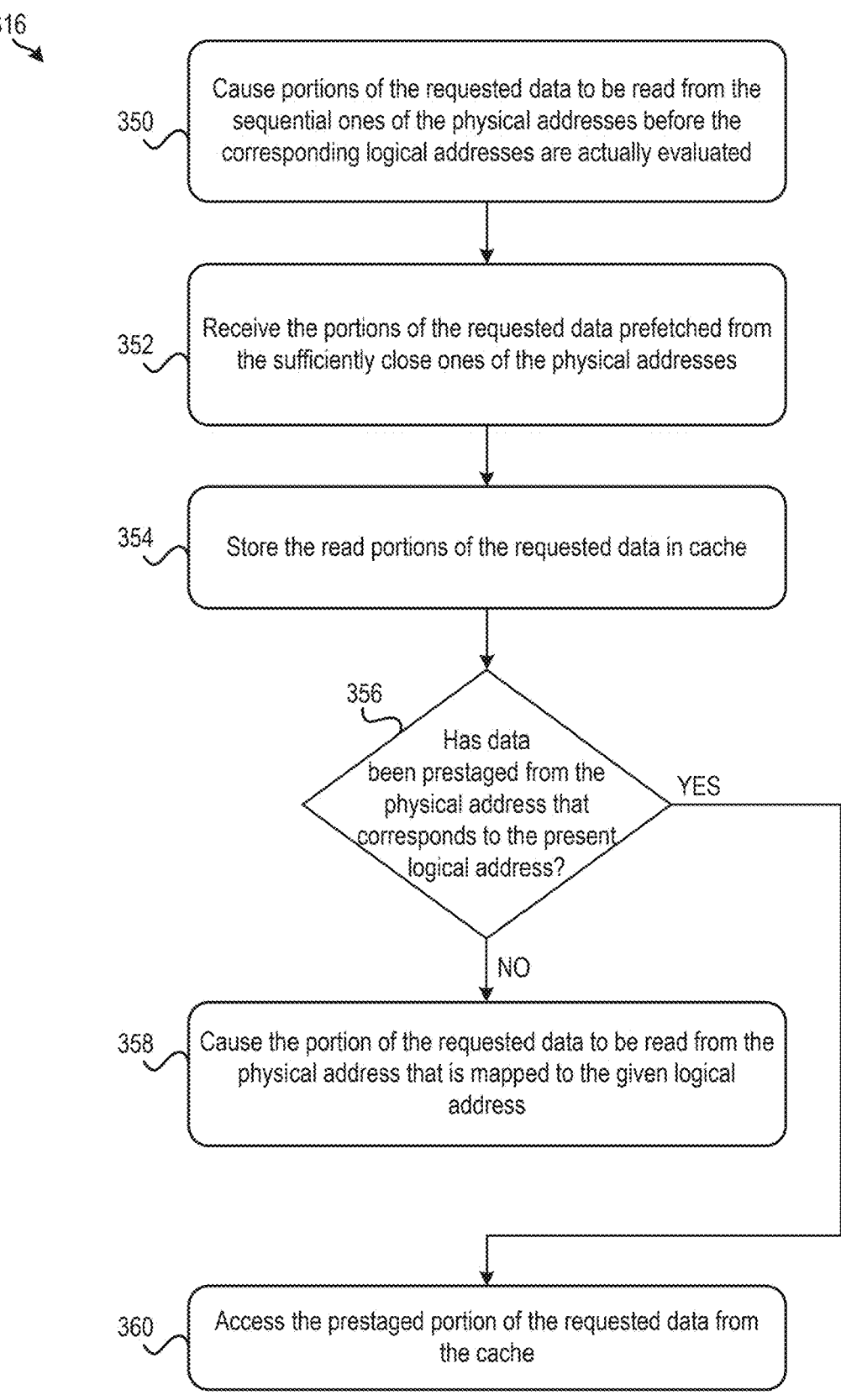

350 — Cause portions of the requested data to be read from the sequential ones of the physical addresses before the corresponding logical addresses are actually evaluated 352 — Receive the portions of the requested data prefetched from the sufficiently close ones of the physical addresses 354 — Store the read portions of the requested data in cache 356 — Has data been prestaged from the physical address that corresponds to the present logical address?

YES

NO

358 — Cause the portion of the requested data to be read from the physical address that is mapped to the given logical address 360 — Access the prestaged portion of the requested data from the cache

FIG. 3B

USING METADATA TO SELECTIVELY PERFORM DATA PRESTAGING

BACKGROUND

The present invention relates to data storage, and more specifically, this invention relates to prestaging data.

Block storage involves controlling data storage and storage devices. For instance, block storage involves dividing any desired data (e.g., file or database entry) into blocks of substantially equal sizes. A block storage system may thereby store the data blocks on underlying physical storage, preferably in a manner that is optimized for fast data access and retrieval. Block storage architectures also provide multiple paths to desired data while file storage architectures only provide one path, which is why block storage is preferred in high performance applications.

While block storage offers some benefits over other types of data storage architectures, conventional products have experienced performance related issues. For instance, conventional products are generally implemented using log-structures (generally b-trees) for forward lookup, a data domain, reverse lookup structures, and journaling approaches to allow the recovery of the forward lookup metadata structures. Block storage volumes implemented in such a way are often referred to as "thin" volumes, in comparison to "thick" volumes.

Data written to thin block storage volumes will not always have sequentially allocated blocks in the physical domain. This is at least partially because this scheme provides a mapping between logical address and physical address. As a result, conventional products have experienced increased data latency stemming from this disconnect between the logical and physical addresses that data is written to.

SUMMARY

A computer-implemented method (CIM), according to one approach, includes: receiving a read request for data in memory and analyzing metadata from volumes that contain the requested data. The metadata maps sequential logical addresses of the requested data to their corresponding physical addresses. The CIM also includes determining whether the corresponding physical addresses storing the requested data are sequential. In response to determining that at least a predetermined number of the corresponding physical addresses are sequential, the requested data is prestaged from the sequential ones of the physical addresses. However, in response to determining that fewer than the predetermined number of the corresponding physical addresses are sequential, the CIM includes intentionally refraining from prestaging any of the requested data from the physical addresses.

A computer program product (CPP), according to another approach, includes: a set of one or more computer-readable storage media. The CPP also includes program instructions that are collectively stored in the set of one or more storage media, and for causing a processor set to perform the foregoing CIM.

A computer system (CS), according to yet another approach, includes: a processor set, and a set of one or more computer-readable storage media. The CS also includes program instructions that are collectively stored in the set of one or more storage media, and for causing the processor set to perform the foregoing CIM.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

FIG. 3B is a flowchart of sub-operations for one or more of the operations in the method of FIG. 3A, in accordance with one approach.

DETAILED DESCRIPTION

Figure 2:
FIG. 2 is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for improving read efficiency using data prefetching. The approaches herein may thereby work in combination to enhance efficiency of a cache prefetch algorithm by determining how requested data is distributed across blocks in memory. This insight of the data distribution may thereby be used to make corresponding adjustments to how and/or whether data is prefetched, based at least in part on how prefetching affects performance, e.g., as will be described in further detail below.

In one general approach, a CIM includes: receiving a read request for data in memory and analyzing metadata from volumes that contain the requested data. The metadata maps sequential logical addresses of the requested data to their corresponding physical addresses. The CIM also includes determining whether the corresponding physical addresses storing the requested data are sequential. In response to determining that at least a predetermined number of the corresponding physical addresses are sequential, the requested data is prestaged from the sequential ones of the physical addresses. However, in response to determining that fewer than the predetermined number of the corresponding physical addresses are sequential, the CIM includes intentionally refraining from prestaging any of the requested data from the physical addresses.

In another general approach, a CPP includes: a set of one or more computer-readable storage media. The CPP also includes program instructions that are collectively stored in the set of one or more storage media, and for causing a processor set to perform the foregoing CIM.

In yet another general approach, a CS includes: a processor set, and a set of one or more computer-readable storage media. The CS also includes program instructions that are collectively stored in the set of one or more storage media, and for causing the processor set to perform the foregoing CIM.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved read performance code at block 150 for improving read efficiency using data prefetching. The approaches herein may thereby work in combination to enhance efficiency of a cache prefetch algorithm by determining how requested data is distributed across blocks in memory. This insight of the data distribution may thereby be used to make corresponding adjustments to how and/or whether data is prefetched, based at least in part on how prefetching affects performance, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, block storage involves controlling data storage and storage devices. For instance, block storage involves dividing any desired data (e.g., file or database entry) into blocks of substantially equal sizes. A block storage system may thereby store the data blocks on underlying physical storage, preferably in a manner that is optimized for fast data access and retrieval. Block storage architectures also provide multiple paths to desired data while file storage architectures only provide one path, which is why block storage is preferred in high performance applications. Block storage can also be space optimized using supplemental techniques, e.g., such as compression and deduplication.

While block storage offers some benefits over other types of data storage architectures, conventional products have experienced performance related issues. For instance, conventional products are generally implemented using log-structures (generally b-trees) for forward lookup, a data domain, reverse lookup structures, and journaling approaches to allow the recovery of the forward lookup metadata structures. Block storage volumes implemented in such a way are often referred to as "thin" volumes, in comparison to "thick" volumes.

Data written to thin block storage volumes will not always have sequentially allocated blocks in the physical domain. This is at least partially because this scheme provides a mapping between logical address and physical address. Sequential logical addresses thereby do not necessarily map to sequential physical addresses. Physical address spaces can also be shared between multiple logical volumes due, for example, to data deduplication techniques.

As a result, conventional products have experienced increased data latency stemming from this disconnect between the logical and physical addresses that data is written to. For instance, data that has been distributed across different locations in the physical storage take longer to access and retrieve requested data from, than if the data had been written to sequential physical addresses.

In sharp contrast to the aforementioned shortcomings, approaches herein are desirably able to implement cache prestaging while reading data from storage systems that implement volumes having Log Structured Array (LSA) based architectures. The distributed manner in which data can be written to thin block storage volumes affects the impact that prestaging has. For instance, benefits of prestaging data depends on how the data was originally written to memory (e.g., block storage). Thus, by evaluating how data being requested was previously written in memory, approaches herein are able to intentionally avoid attempting to prestage data in situations that doing so would actually harm performance. Thus, approaches herein are desirably able to avoid attempting to prestage (also referred to synonymously herein as "prefetch") random data that may be interleaved between portions of requested data, while also ensuring that data is successfully prefetched from sequential memory addresses, e.g., as will be described in further detail below.

Looking now to FIG. 2, a distributed data storage system 200 in accordance with one approach. As an option, the present system 200 may be implemented in conjunction with features from any other approach listed herein, such as those described with reference to the other FIGS. However, this distributed data storage system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the distributed data storage system 200 includes a central server 202 that is connected to edge nodes 204, 206. Specifically, the central server 202 and edge nodes 204, 206 are connected to a network 210 that allows for data (e.g., information, commands, requests, instructions, responses, encrypted data, etc.) to be sent between any of the locations 202, 204, 206. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc.

It should be noted that with respect to the present description, "data" may include any desired type of information. For instance, in different implementations data can include raw sensor data, program commands, instructions, etc. "Metadata" as used herein refers to additional data that describes the primary "data" stored and maintained in the storage system. Metadata corresponding to a given volume (e.g., block storage volume) may thereby be stored in the volume. Moreover, while implementations herein are described in the context of data and metadata that is compatible with LSA based architectures (e.g., stored in blocks on logical volumes), this is in no way intended to be limiting. For instance, data may be protected with different types of security features depending on the approach. The way in which data is protected has an impact on how that data may be processed and/or stored. For instance, data encryption may be implemented in combination with data compression in any of the various approaches herein.

As a result, any desired information, data, commands, instructions, responses, requests, etc. may be sent between the locations 202, 204, 206, regardless of the amount of separation which exists therebetween, e.g., despite being positioned at different geographical locations. It should also be noted that the different locations 202, 204, 206 may be connected to each other (and/or other locations) differently depending on the approach. According to an example, two data storage systems may be located relatively close to each other and connected by a wired connection, e.g., a cable, a fiber-optic link, a wire, etc.; etc., or any other type of connection which would be apparent to one skilled in the art after reading the present description.

With continued reference to FIG. 2, the edge nodes 204, 206 may each be configured to provide a respective local data storage system. The central server 202 may also be configured as a respective storage system. Data may thereby be stored at any of the locations 202, 204, 206 and/or transferred therebetween as desired. According to an example, the edge nodes 204, 206 and/or central server 202 may each be a DS8000 series storage media platform capable of storing data and satisfying various I/O requests received from network 210. The edge nodes 204, 206 and central server 202 may thereby include any one or more desired types of memory.

It should also be noted that the distributed data storage system 200 or any specific portion(s) thereof (e.g., such as edge node 204, edge node 206, and/or central server 202) may implement memory that has LSA based architectures. In other words, the memory throughout system 200 may be configured such that data (and in some approaches, metadata describing the data) is stored in volumes that have LSA based architectures. For instance, data may be written to thin block storage volumes. As noted above, data written to thin block storage volumes will not always have sequentially allocated blocks in the physical domain. This is at least partially because this scheme provides a mapping between logical address and physical address. Sequential logical addresses thereby do not necessarily map to sequential physical addresses. Physical address spaces can also be shared between multiple logical volumes.

It follows that each of the logical volumes may be mapped to a physical domain via an LSA structure (or other mapping structure). For LSA based architectures (e.g., structures), the allocation block in the physical domain may not be a multiple of the extent size of the system. Thus, multiple volumes may be allocated to a block of storage from the same physical extent. Large sequential data writes may therefore end up being spread across non-adjacent allocation blocks depending on how the blocks are allocated and distributed. Data that may have corresponded to large writes or reads for a host may end up being small numbers of blocks in situations where the data is compressed. Similarly, deduplicated data may result in deduplication hits being spread across the whole deduplication domain. Moreover, the deduplication block sizes used may be very different to the writes that seeded the data. This leads to a data layout in the physical domain that prestage read algorithms will fail to optimize as the preceding read is not a good hint to what reads may be coming next, e.g., as would be appreciated by one skilled in the art after reading the present description.

The system 200 may thereby process (e.g., handle) data by packing it into logical segments that are appended to a global log structure. This global log structure may vary in size and may span across multiple memory devices. Thus, as data is written (potentially out-of-place) in the LSA based architecture, a dynamic mapping between the logical addresses and the physical addresses that given data is correlated to is preferably maintained to keep track of data placement in memory.

As alluded to above, approaches herein desirably improve performance by referencing this dynamic mapping while performing read operations. For instance, efficiency achieved by a cache prefetch algorithm may be improved by evaluating metadata associated with LSA based volumes in order to determine how requested data is distributed across stored blocks. The metadata may be stored in the volumes themselves (e.g., in a predetermined location, in a header, etc.). This insight of the data distribution may thereby be used to make corresponding adjustments to how and/or whether data is prefetched. For example, certain data may intentionally not be prefetched in situations where it is determined that doing so will negatively affect overall performance. However, in situations where it is determined that prefetching will improve overall performance (e.g., when requested data is stored in sequential physical addresses), data may be prestaged from memory. For instance, metadata associated with a forward lookup may be used to map each of the logical addresses to the physical addresses, and can be reviewed on the initial read request. In situations where the proceeding virtual addresses map into a continuation in the physical domain, the read can be marked with a hint to the cache prefetcher that performing a data prefetch is determined as improving performance. However, if the proceeding virtual addresses are not consecutive in the physical domain, the prefetch can be marked to be bypassed, as there is unlikely to be a benefit of performing prefetching, e.g., as will be described in further detail below.

Memory in system 200 may also handle (e.g., store) data differently depending on the particular approach. For instance, in some approaches, one or more RAID configurations may be implemented across the edge nodes 204, 206 and/or central server 202. In other words, redundant portions of data may be stored across the edge nodes 204, 206 and/or central server 202 in order to improve data retention. The edge nodes 204, 206 and/or central server 202 may also be configured to implement data compression. Data compression desirably improves storage capacity by reducing the effective size of the data being stored in memory. Accordingly, each of the edge nodes 204, 206 are shown as including a compression engine 207 coupled to the central controller 208 (e.g., processor) thereof. The compression engine 207 may work together with the controller 208 to compress data before writing the compressed data into memory 212. Depending on the approach, the compression engine 207 in each of the edge nodes 204, 206 may implement any desired compression configuration (e.g., compression scheme). In other words, each of the edge nodes 204, 206 may use the respective compression engine 207 to apply a desired compression rate, compression pattern, formatting details, compressed data lookup scheme, etc.

While the edge nodes 204, 206 and/or central server 202 may each implement data compression as desired, in preferred approaches the different locations apply the same or substantially similar compression schemes. In other words, the compression engine 207 in each edge node 204, 206 preferably compresses data the same, e.g., such that it is written to and/or read from memory using the same steps, techniques, formatting details, etc., e.g., as would be appreciated by one skilled in the art after reading the present description. In other approaches, the controllers 208 are configured to instruct the compression engines 207 to follow the same processes, thereby achieving the same or substantially similar compression configurations in both edge nodes 204, 206.

Implementing the same or substantially similar data compression techniques as such desirably allows for compressed data to be transferred between the edge nodes 204, 206 without decompressing and/or recompressing the data in order to do so. In other words, compressed data may be transferred between two environments that implement the same or similar compression configurations. While the compressed data may be unintelligible and/or inaccessible in transit between the edge nodes 204, 206 (e.g., while at the central server 202), it can be written to a specific target location (e.g., compression boundary) in memory of the respective edge node 204, 206 without first recompressing the data. Thus, by monitoring data operations for those that involve transferring compressed data between locations (e.g., compressed drives) that implement a same and/or substantially similar compression configuration, approaches herein are able to significantly reduce the processing overhead consumed in the system by data transfers. The same is true for data transfers between locations in the same data storage, e.g., such as transferring and/or copying compressed data from a first drive in a data storage system, to a second drive in the data storage system.

Referring still to FIG. 2, the memory 212 at edge nodes 204, 206 may include any amount, type, configuration, etc. of storage components therein. For instance, the present approach includes an array of hard disk drives (HDDs) 214, along with a non-volatile random access memory (NVRAM) module 216. The NVRAM module 216 may further include Flash memory, phase change memory (PCM), etc., or any other desired type of NVRAM. It follows that the array of HDDs 214 and NVRAM module 216 are configured and used to store various data. According to some approaches, a majority of the data is stored in blocks on volumes of the HDDs 214. Data that is read from the HDDs 214 may be accumulated in the NVRAM module 216. Thus, prefetched data may be stored in a cache on the NVRAM module 216. This significantly reduces the latency associated with accessing the data from NVRAM module 216 in comparison to accessing it from the HDDs 214 in real-time, e.g., as would be appreciated by one skilled in the art after reading the present description.

Edge nodes 204, 206 may receive inputs from, and interface with, users 220, 222. For instance, users 220, 222 may input information using one or more of: a display screen 224, keys of a computer keyboard 226, a computer mouse 228, a microphone (not shown), a camera (not shown), etc. The controller 208 may thereby be configured to receive inputs (e.g., text, sounds, images, motion data, etc.) from any of these components as entered by the users 220, 222. These inputs typically correspond to information presented on the display screen 224 while the entries were received. Moreover, the inputs received from the keyboard 226 and computer mouse 228 may impact the information shown on display screen 224, data stored in memory 212, information collected from a microphone and/or camera, status of an operating system being implemented by controller 208, etc. In some approaches, the inputs received from users 220, 222 cause one or more data write and/or read operations to be performed in memory 212.

The central server 202 further includes a large (e.g., robust) processor 230 coupled to a cache 232 and memory 234 having a dedicated storage controller 235 and a relatively high storage capacity. The processor 230 further includes a compression engine 236. As alluded to above, the compression engine 236 may be configured in some approaches to not decompress (e.g., process) compressed data being transferred between the edge nodes 204, 206, or any other locations implementing the same or substantially similar compression configurations. Rather, the received data is maintained in compressed formed before being sent to the target location and written to memory.

It follows that the central server 202 may help facilitate data transfers between storage locations, e.g., as a result of receiving instructions from an administrator 203. For example, central server 202 may cause (e.g., initiate) a transfer (e.g., copy, movement, etc.) of compressed data from edge node 204 to edge node 206. This transfer may thereby initiate with a read operation performed at the sources in some approaches, before the read data travels to the central server 202 and is sent along to the target edge node. Performing the read operation thereby preferably includes evaluating the physical distribution of data being read in order to determine whether any of the data should be prefetched from memory. It follows that processor 230 may perform any one or more of the operations in method 300 of FIG. 3A below. Similarly, controllers 208 at edge nodes 204, 206 may be used to perform one or more of the operations in method 300 of FIG. 3A below.

Figure 3A:
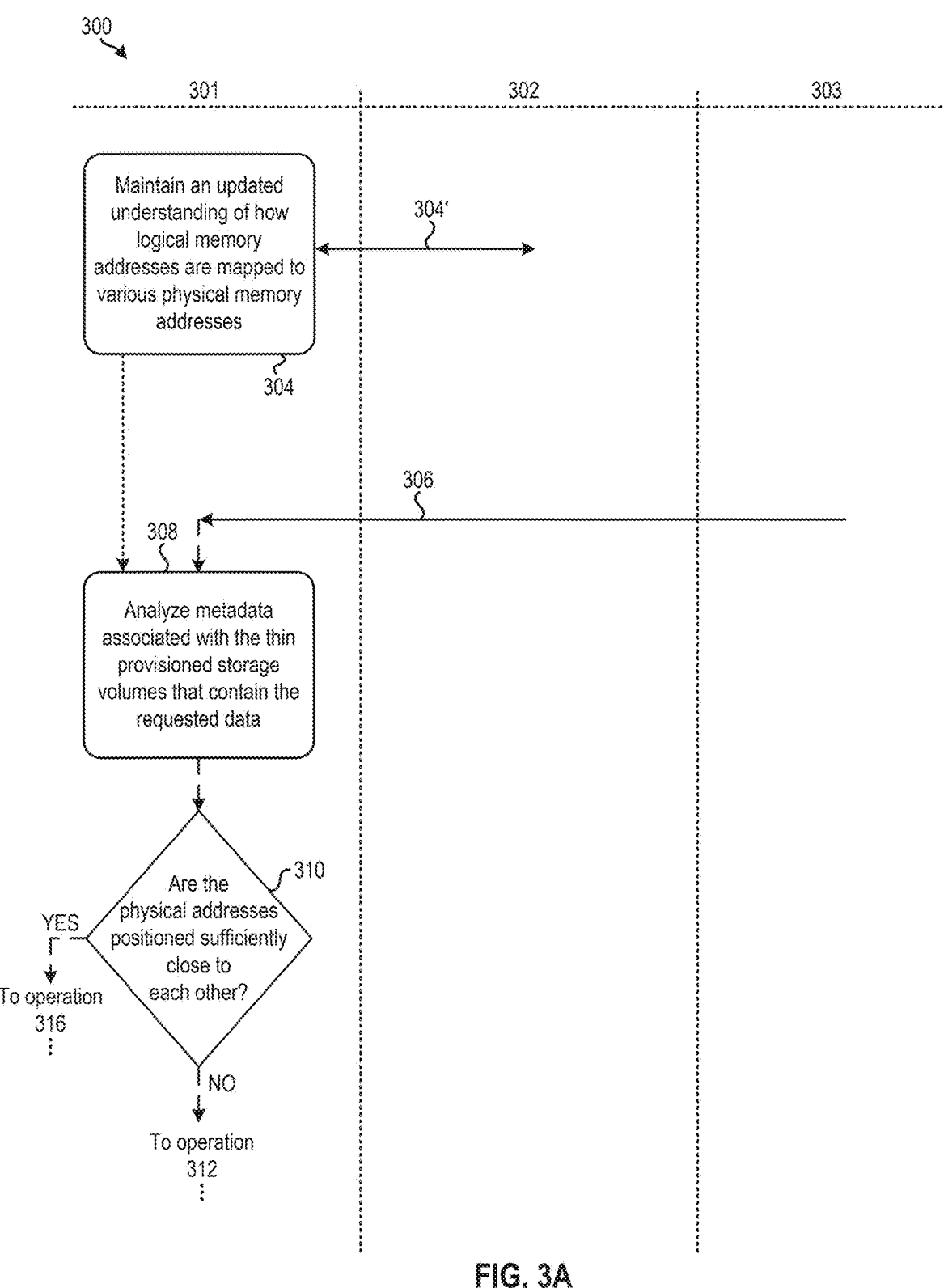
FIG. 3A is a flowchart of a method, in accordance with one approach.
Figure 3A:
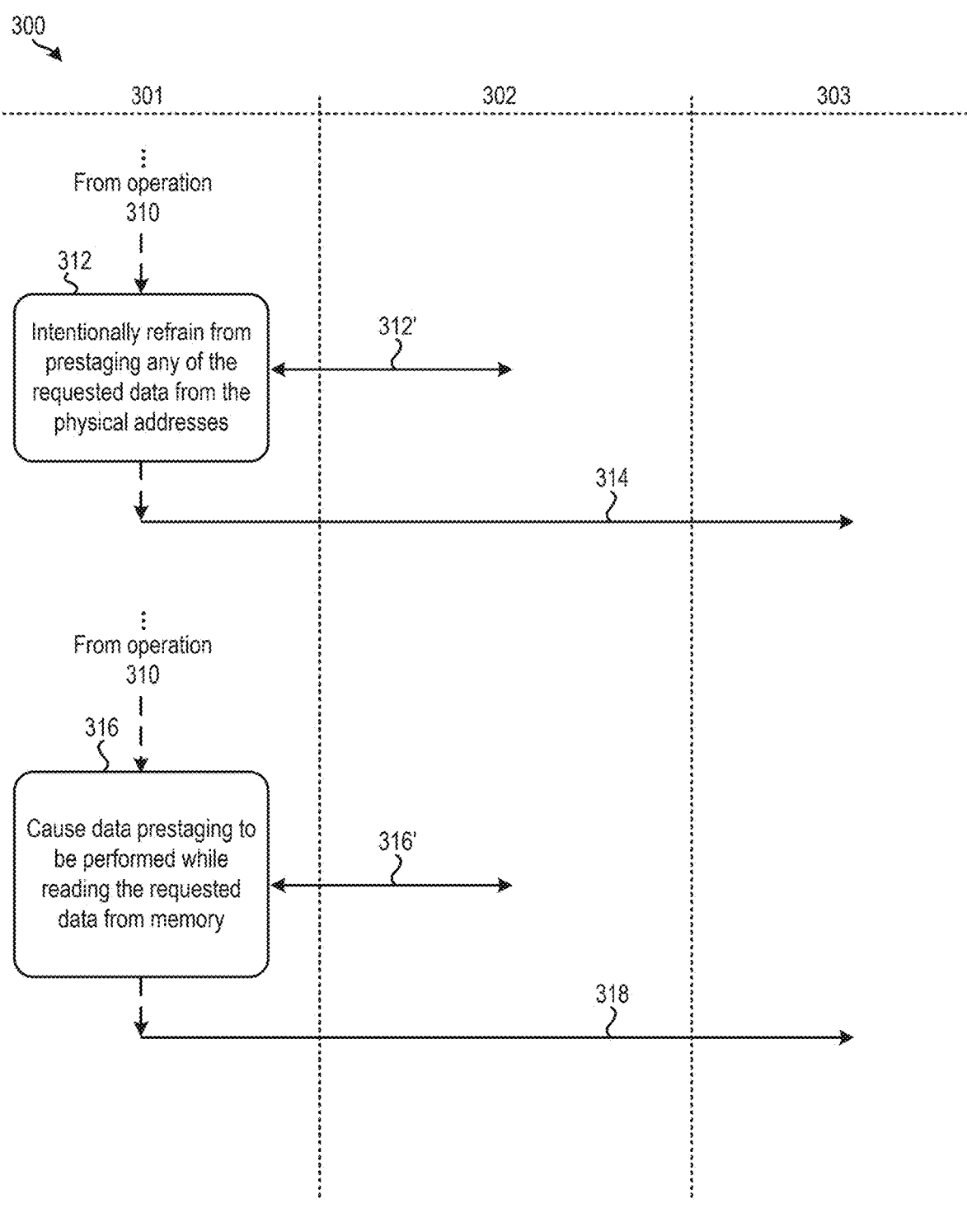

Looking now to FIG. 3A, a flowchart of a computer-implemented-method 300 for improving read efficiency using data prefetching. The operations of method 300 may thereby work in combination to enhance efficiency of a cache prefetch algorithm by determining how requested data is distributed across stored blocks. This insight of the data distribution may thereby be used to make corresponding adjustments to how and/or whether data is prefetched, based at least in part on how prefetching affects performance, e.g., as will be described in further detail below.

The method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions. Each of the operations in method 300 may be performed by any suitable component of the operating environment. For example, the nodes 301, 302, 303 shown in the flowchart of method 300 may correspond to one or more processors positioned at a different location in a distributed system. Moreover, each of the one or more processors are preferably configured to communicate with each other.

In various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, 303, each of which represent one or more processors, controllers, computer, etc., positioned at a different location in a distributed system. For example, in some approaches one or more of the operations in method 300 may involve one or more components in a system having data stored in a LSA based architecture. Accordingly, node 301 may include one or more processors which are located at a central server of a distributed system (e.g., see processor 230 of FIG. 2). Moreover, node 302 may include one or more storage controllers associated with memory (e.g., see controller 235 of FIG. 2). Furthermore, node 303 may include one or more processors at a location that is issuing a data read request (e.g., see edge nodes 204, 206 of FIG. 2).

Accordingly, commands, code, data, metadata outlining code updates, etc., may be sent between the nodes 301, 302, 303 depending on the approach. It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches. Moreover, although the operations of method 300 are described in the context of systems implementing LSA based architectures, the improvements achieved by implementing selective data prefetching as described in the approaches herein may be extended to other data architectures.

Looking to FIG. 3A, operation 304 includes maintaining an updated understanding of how logical memory addresses are mapped to various physical memory addresses. As noted above, data written to thin block storage volumes will not always have sequentially allocated blocks in the physical domain. This is at least partially because this scheme provides a mapping between logical address and physical address. Sequential logical addresses thereby do not necessarily map to sequential physical addresses. Physical address spaces can also be shared between multiple logical volumes. Thus, as data is written (potentially out-of-place) in the LSA based architecture, a dynamic mapping between the logical addresses and the physical addresses that given data is correlated to is preferably maintained to keep track of data placement in memory.

As shown, operation 304' involves exchanging information between node 301 and node 302. Operation 304' may thereby involve node 301 sending one or more requests to memory at node 302 for updated mapping information. Operation 304' may also include memory at node 302 providing node 301 with updated mapping information that explains how the logical and physical addresses are currently assigned to each other. Again, node 301 is able to maintain an accurate understanding of how the logical addresses are mapped to the physical addresses over time. The mapping may thereby be referenced at any point in time, e.g., in order to perform a received read operation.

For example, operation 306 includes node 303 sending a read request to node 301. In other words, operation 306 involves locating (e.g., accessing) and reading specific data from memory. The read request may be issued by an application running at node 303, a host having access to node 303, automatically in response to a predetermined condition being met, etc. For instance, the read request may be received in correlation with a transfer request. According to a non-limiting example, background copy requests in Flash copy may be used to copy data from a source volume to a target volume. According to another non-limiting example, approaches implementing peer-to-peer remote copy may use initial copy to copy data from a source volume to a secondary volume.

In response to receiving the read request at node 301, method advances to operation 308. It should be noted that in preferred approaches, the read request is received by (e.g., through) a caching layer at node 301. There, operation 308 includes analyzing metadata associated with the thin provisioned storage volumes that contain the requested data. In other words, operation 308 includes accessing metadata that describes details about data that is stored in volumes. For instance, the metadata corresponding to the requested data includes information that maps the sequential logical addresses (e.g., logical address ranges) assigned to the requested data, to their respective physical addresses in memory. The metadata may thereby be used to determine whether any of the physical addresses corresponding to a read request are positioned sufficiently close to each other that prefetching the data would improve overall performance of the read request. As mentioned above, the specifics of what data storage configurations support the use of data prefetching depends on the particular approach. In some approaches, the metadata is used to determine whether at least some of the desired physical addresses are oriented sequentially (e.g., directly adjacent to each other). In other approaches, the metadata is used to determine whether the distance separating physical addresses having the requested data is within a predetermined range.

Accordingly, method 300 advances from operation 308 to operation 310. There, operation 310 includes determining whether any of the physical addresses storing the requested data are positioned sufficiently close to each other. As mentioned above, in some approaches sequential physical addresses are considered "sufficiently close to each other," warranting that data prefetching is performed. In other approaches, physical addresses that have fewer than a predetermined number of addresses therebetween may support performing data prefetching. In still other approaches, each of the physical addresses containing at least a portion of the requested data may be evaluated to determine an overall physical distribution of the requested data. Thus, operation 310 may conclude the physical addresses are sufficiently close to perform data prefetching in response to determining the data has an overall physical distribution that is in a predetermined range (e.g., is sufficiently contained).

It follows that operation 310 includes accessing the dynamic mapping maintained in operation 304. As noted above, this mapping provides an updated understanding of how logical memory addresses are mapped to various physical memory addresses. Again, data written to thin block storage volumes will not always have sequentially allocated blocks in the physical domain. Sequential logical addresses thereby do not necessarily map to sequential physical addresses, and physical address spaces can be shared between multiple logical volumes. The dynamic mapping thereby provides valuable insight as to which physical addresses the respective logical addresses correspond to.

In still further approaches, operation 310 may evaluate the physical addresses storing the requested data in different chunks. In other words, while one chunk (e.g., portion) of the physical addresses may be identified as being sufficiently close to each other (e.g., sequential), and a second chunk of the physical addresses may be identified as being sufficiently close to each other, the first and second chunks themselves may not be sufficiently close to each other. In such situations, the different chunks may be evaluated individually.

As mentioned above, caching techniques in storage systems attempt to minimize the impact on performance of read and write operations to the underlying memory (e.g., disks). For instance, write operations are often coalesced into larger full strides writes that are tailored for RAID to write without reading to compute parity deltas. Data that has been written may thereafter be kept in memory (e.g., on the storage controller in cache). This allows for faster access times in the event the written data is requested (e.g., read). Any active reads staged from memory may also be maintained in cache in the event they are read again. It follows that operation 310 may evaluate different factors depending on the particular approach.

Method 300 is shown as advancing from operation 310 to operation 312 in response to determining that the physical addresses storing the requested data are not positioned sufficiently close to each other. In other words, the flowchart proceeds to operation 312 in response to determining that fewer than a predetermined number of the corresponding physical addresses are positioned sequentially with respect to each other. There, operation 312 includes intentionally refraining from prestaging any of the requested data from the physical addresses. In other words, operation 312 includes satisfying the read request originally received in operation 306 without prefetching any data from memory. Each block of the requested data may thereby be read from memory at node 302.

Operation 312' thereby includes exchanging information between nodes 301 and 302. In some approaches, operation 312' includes sending one or more instructions to node 302 that ensure data is not prefetched from memory. Again, while prestaging data from memory seems like it would improve performance in any situation, this is untrue in certain scenarios. For example, data that is spread too far across the different physical storage locations may be undesirably difficult to access, making prefetching counterproductive.

From operation 312, method 300 advances to operation 314. There, the requested data that has been read from memory without implementing any data prefetching is accumulated and sent to node 303. In other words, operation 314 includes satisfying the read request received in operation 306.

Returning to operation 310, method 300 proceeds to operation 316 in response to determining that the physical addresses storing the requested data are positioned sufficiently close to each other. In other words, the flowchart proceeds to operation 316 in response to determining that more than a predetermined number of the corresponding physical addresses are positioned sequentially (or at least sufficiently close) with respect to each other.

There, operation 316 includes causing data prestaging to be performed while reading the requested data from memory. In other words, operation 316 includes prestaging requested data from the physical addresses determined as being sufficiently close to each other to warrant performing the data prestaging. Prefetch read operations may thereby be performed on data that is stored sufficiently close to each other physically. In some approaches, the prestaging is performed in response to instructions that are actually sent to physical memory where the requested data is stored. Accordingly, operation 316' is shown as exchanging information, data, instructions, commands, responses, etc., between nodes 301 and 302.

Referring momentarily to FIG. 3B, exemplary sub-operations of causing a prefetch algorithm to prestage requested data from ones of the physical addresses that are sufficiently close to each other are illustrated in accordance with one approach. It follows that one or more of these sub-operations may be used to perform operation 316 of FIG. 3A. However, it should be noted that the sub-operations of FIG. 3B are illustrated in accordance with one approach which is in no way intended to be limiting.

As shown, sub-operation 350 includes causing portions of the requested data to be read from the sequential ones of the physical addresses before the corresponding logical addresses are actually evaluated. In other words, sub-operation 350 determines the current logical address being evaluated as a part of the read request being performed, and identifies other logical addresses that contain other portions of the requested data and that also correspond to physical addresses in memory which are sufficiently close to each other (e.g., sequential). Again, because the system is already in the process of reading a portion of the requested data from a physical memory location that is nearby other physical memory locations that contain other portions of the requested data, approaches herein are desirably able to reduce latency by prefetching the requested data from these nearby physical locations. The mapping information that connects the logical addresses with the respective physical addresses may thereby be referenced to identify the physical locations that the requested data is stored.

Each logical address assigned data that is referenced in a read request may be evaluated independently. Thus, each logical address is evaluated and mapped to the corresponding physical address in a sequential manner. It follows that at least some of the sub-operations in FIG. 3B (and/or at least some of the operations in FIG. 3A) may be repeated in an iterative fashion for each portion of requested data, logical address, memory block, etc.

Proceeding to sub-operation 352, the portions of the requested data prefetched from the sufficiently close ones of the physical addresses are received. Moreover, sub-operation 354 includes storing the read portions of the requested data in cache. In other words, the prefetched portions of the requested data may be accumulated and at least temporarily stored in cache or some other high-performance memory. In some approaches, the prefetched data may be stored in a predetermined location in memory.

In response to prefetching data from each of the sequential ones of the physical addresses, the flowchart advances from sub-operation 354 to sub-operation 356. There, sub-operation 356 includes evaluating each of the remaining logical addresses referenced in the read request, and determining whether each respective logical address is currently mapped to a respective one of the physical addresses from which requested data has been prestaged. In other words, sub-operation 356 includes determining whether the requested data corresponding to a current logical address referenced in the read request has been prefetched and stored in cache for easier (e.g., quicker) access.

In response to determining that data has not been prefetched from the physical address mapped to the given (e.g., currently evaluated) logical address, the flowchart proceeds from sub-operation 356 to sub-operation 358. There, sub-operation 358 includes causing the portion of the requested data to be read from the physical address that is mapped to the given logical address. In other words, sub-operation 358 includes sending one or more instructions to a memory controller that ultimately result in the data being read from memory. The data received from memory in response to sub-operation 358 being performed may be accumulated with data that has been read from other ones of the physical addresses that correspond to the present read request. The data may be accumulated in cache (e.g., see cache 232 and/or NVRAM module 216 of FIG. 2) at least temporarily.

It follows that the flowchart proceeds from sub-operation 358 back to operation 318 of FIG. 3A in response to accumulating the desired amount of data read from memory. Again, the number of physical addresses from which data may be prefetched vs. read from memory while satisfying a read request depends on the number of physical addresses that are sufficiently close to each other that performing the data prefetching actually reduces overall latency experienced while performing each read operation.

However, returning to sub-operation 356 of FIG. 3B, the flowchart advances to sub-operation 360 in response to determining that data has been prefetched from the physical address mapped to the given (e.g., currently evaluated) logical address. There, sub-operation 360 includes accessing the prestaged portion of the requested data from the cache. In other words, sub-operation 360 includes sending one or more instructions to a memory controller that ultimately result in the data being accessed (e.g., copied) from cache.

The data received from memory in response to sub-operation 360 being performed may be accumulated with data that has been read from other ones of the physical addresses that correspond to the present read request. The data may be accumulated in a buffer at least temporarily. In some approaches, the data prefetched from each sequential physical address may be accumulated in the cache and referenced (e.g., accessed) as each respective portion of the read request is performed. Data prefetched from physical addresses that are sufficiently close to each other (e.g., sequential physical addresses) may be maintained in cache for a predetermined amount of time, until rewritten with new data (e.g., according to a circular buffer implementing a first-in-last-out management technique), until a predetermined condition is met, etc.

The flowchart proceeds from sub-operation 360 back to operation 318 of FIG. 3A in response to accumulating the desired amount of prefetched data. Returning back now to FIG. 3A, method 300 advances from operation 316 to operation 318. There, the requested data is sent to node 303. In other words, operation 318 includes using the data that has been prestaged, along with any data that was read from memory, to satisfy the read request received in operation 306. It follows that the data prestaged in cache allows for operations 316 and 318 to be performed more efficiently (e.g., in a shorter amount of time) than operations 312 and 314.

It follows that approaches herein are desirably able to implement cache prefetching while reading data from storage systems that implement volumes having LSA based architectures. As noted above, the distributed manner in which data can be written to thin block storage volumes affects the impact that prefetching has. For instance, benefits of prefetching data may depend on how the data was originally written to memory. Thus, by evaluating how data being requested was written in memory, approaches herein are able to intentionally avoid attempting to prefetch data in situations that doing so would actually harm performance. Thus, approaches herein are desirably able to avoid attempting to prefetch (e.g., prestage) random data that may be interleaved between portions of requested data, while also ensuring that data is successfully prefetched from sequential memory addresses.

Approaches herein achieve this improved performance by maintaining and referencing a dynamic mapping of logical to physical addresses while performing read operations. For instance, efficiency achieved by a cache prefetch algorithm may be improved by evaluating metadata associated with LSA based volumes in order to determine how requested data is distributed across blocks in memory. This insight of the data distribution may thereby be used to make corresponding adjustments to how and/or whether data is prefetched. For example, certain data may intentionally not be prefetched in situations where it is determined that doing so will negatively affect overall performance. However, in situations where it is determined that prefetching will improve overall performance (e.g., when requested data is stored in sequential physical addresses), data may be prestaged from memory.

It follows that the thin provision volumes used herein each contain the metadata associated with mapping the logical address ranges to their associated physical addresses. Moreover, LSA metadata is loaded (if not already in memory) to service a read operation, and the lookup of the metadata can thereby map each of the logical addresses to their respective physical location. In situations that read requests are issued through a caching layer, these physical addresses are requested and may trigger prefetch reads.

Metadata also preferably includes lookup information for the proceeding logical addresses. In situations where there are sequential physical addresses mapping from sequential logical addresses, it may be concluded that prefetching is beneficial to read ahead and stage the corresponding physical addresses. The opposite is also true in that if the metadata proceeding logical address does not map to adjacent physical addresses (e.g., they are actually deduplication references to some other written data), prefetching the data should actively be avoided, and no prefetch of data is attempted.

Again, these techniques are implemented by the approaches herein in order to successfully reduce latency experienced while performing data read requests, even while implementing data prefetching. Moreover, this is achieved with virtually no additional computation overhead, as the referenced metadata will already be available for the surrounding logical address space. Furthermore, performing a comparison operation on the next physical address provides the information associated with performing the prefetching as part of the read request. This information is used to indicate if prefetching beyond the requested read is desired (e.g., would improve performance) or not.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
receiving a read request for data in memory;
analyzing metadata from volumes that contain the requested data, wherein the metadata maps sequential logical addresses of the requested data to their corresponding physical addresses;
determining whether the corresponding physical addresses storing the requested data are sequential;
in response to determining that at least a predetermined number of the corresponding physical addresses are sequential, prestaging the requested data from the sequential ones of the physical addresses; and
in response to determining that fewer than the predetermined number of the corresponding physical addresses are sequential, intentionally refraining from prestaging any of the requested data from the physical addresses.

2. The CIM of claim 1, wherein the volumes that contain the requested data are thin provisioned storage volumes, wherein the volumes have log structured array based architectures.

3. The CIM of claim 1, wherein the prestaging of the requested data from the sequential ones of the physical addresses includes:
causing portions of the requested data to be read from the sequential ones of the physical addresses before the corresponding ones of the sequential logical addresses are evaluated; and
storing the read portions of the requested data in cache.

4. The CIM of claim 3, further comprising, for each of the sequential logical addresses:
in response to determining that a given one of the sequential logical addresses maps to a respective one of the sequential physical addresses, accessing the prestaged portion of the requested data from the cache.

5. The CIM of claim 3, further comprising, for each of the sequential logical addresses:
in response to determining that a given one of the sequential logical addresses does not map to a respective one of the sequential physical addresses, causing a respective portion of the requested data to be read from a respective one of the physical addresses that corresponds to the given one of the sequential logical addresses.

6. The CIM of claim 1, wherein the memory includes magnetic disks, wherein the portions of the requested data read from the sequential ones of the physical addresses are stored in the cache prior to inspecting a first of the sequential logical addresses.

7. The CIM of claim 1, further comprising:
in response to the portions of the requested data read from the sequential ones of the physical addresses being stored in the cache, initiating the read request by evaluating a first of the sequential logical addresses, wherein the read request is received by a caching layer.

8. A computer program product (CPP), comprising:
a set of one or more computer-readable storage media; and
program instructions, collectively stored in the set of one or more storage media, for causing a processor set to perform the following computer operations:
receive a read request for data in memory;
analyze metadata from that contain the requested data, wherein the metadata maps sequential logical addresses of the requested data to their corresponding physical addresses, wherein the volumes have log structured array based architectures;

determine whether the corresponding physical addresses storing the requested data are sequential;

in response to determining that at least a predetermined number of the corresponding physical addresses are sequential, prestage the requested data from the sequential ones of the physical addresses; and in response to determining that fewer than the predetermined number of the corresponding physical addresses are sequential, intentionally refrain from prestaging any of the requested data from the physical addresses.

9. The CPP of claim 8, wherein the volumes that contain the requested data are thin provisioned storage volumes.

10. The CPP of claim 8, wherein the prestaging of the requested data from the sequential ones of the physical addresses includes:

causing portions of the requested data to be read from the sequential ones of the physical addresses before the corresponding ones of the sequential logical addresses are evaluated; and storing the read portions of the requested data in cache.

11. The CPP of claim 10, wherein the program instructions are for causing the processor set to further perform the following computer operations, for each of the sequential logical addresses:

in response to determining that a given one of the sequential logical addresses maps to a respective one of the sequential physical addresses, access the prestaged portion of the requested data from the cache.

12. The CPP of claim 10, wherein the program instructions are for causing the processor set to further perform the following computer operations, for each of the sequential logical addresses:

in response to determining that a given one of the sequential logical addresses does not map to a respective one of the sequential physical addresses, cause a respective portion of the requested data to be read from a respective one of the physical addresses that corresponds to the given one of the sequential logical addresses.

13. The CPP of claim 8, wherein the memory includes magnetic disks.

14. The CPP of claim 8, wherein the read request is received by a caching layer.

15. A computer system (CS), comprising:

a processor set;

a set of one or more computer-readable storage media;

program instructions, collectively stored in the set of one or more storage media, for causing the processor set to perform the following computer operations:

receive a read request for data in memory;

analyze metadata from volumes that contain the requested data, wherein the metadata maps sequential logical addresses of the requested data to their corresponding physical addresses, wherein the volumes have log structured array based architectures;

determine whether the corresponding physical addresses storing the requested data are sequential;

in response to determining that at least a predetermined number of the corresponding physical addresses are sequential, prestage the requested data from the sequential ones of the physical addresses; and in response to determining that fewer than the predetermined number of the corresponding physical addresses are sequential, intentionally refrain from prestaging any of the requested data from the physical addresses.

16. The CS of claim 15, wherein the volumes that contain the requested data are thin provisioned storage volumes.

17. The CS of claim 15, wherein the prestaging of the requested data from the sequential ones of the physical addresses includes:

causing portions of the requested data to be read from the sequential ones of the physical addresses before the corresponding ones of the sequential logical addresses are evaluated; and storing the read portions of the requested data in cache.

18. The CS of claim 17, wherein the program instructions are for causing the processor set to further perform the following computer operations, for each of the sequential logical addresses:

in response to determining that a given one of the sequential logical addresses maps to a respective one of the sequential physical addresses, access the prestaged portion of the requested data from the cache.

19. The CS of claim 17, wherein the program instructions are for causing the processor set to further perform the following computer operations, for each of the sequential logical addresses:

in response to determining that a given one of the sequential logical addresses does not map to a respective one of the sequential physical addresses, cause a respective portion of the requested data to be read from a respective one of the physical addresses that corresponds to the given one of the sequential logical addresses.

20. The CS of claim 15, wherein the program instructions are for causing the processor set to further perform the following computer operations:

in response to the portions of the requested data read from the sequential ones of the physical addresses being stored in the cache, initiate the read request by evaluating a first of the sequential logical addresses;

in response to determining that the first of the sequential logical addresses maps to a respective one of the sequential physical addresses, access the prestaged portion of the requested data from the cache; and in response to determining that the first of the sequential logical addresses does not map to a respective one of the sequential physical addresses, cause a respective portion of the requested data to be read from one of the physical addresses that corresponds to the first of the sequential logical addresses, wherein the memory includes magnetic disks, wherein the read request is received by a caching layer.

* * * * *